US010809722B2

(12) United States Patent
Glebov et al.

(10) Patent No.: US 10,809,722 B2
(45) Date of Patent: Oct. 20, 2020

(54) NAVIGATION SYSTEM WITH ROUTE PREDICTION MECHANISM AND METHOD OF OPERATION THEREOF

(71) Applicant: Telenav, Inc., Santa Clara, CA (US)

(72) Inventors: Alexander G. Glebov, San Jose, CA (US); Kok Wei Koh, Mountain View, CA (US); Manuj Shinkar, Sunnyvale, CA (US); Gregory Stewart Aist, Santa Clara, CA (US); HaiPing Jin, Saratoga, CA (US); Sarvesh Bansilal Devi, Milpitas, CA (US); Shalu Grover, Sunnyvale, CA (US); Jinghai Ren, Milpitas, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 220 days.

(21) Appl. No.: 15/882,648

(22) Filed: Jan. 29, 2018

(65) Prior Publication Data

US 2019/0235497 A1 Aug. 1, 2019

(51) Int. Cl.

*G05D 1/00* (2006.01)
*G01C 21/36* (2006.01)
*G05D 1/02* (2020.01)
*B60W 50/00* (2006.01)

(52) U.S. Cl.

CPC .......... *G05D 1/0088* (2013.01); *B60W 50/00* (2013.01); *G01C 21/3667* (2013.01); *G05D 1/0212* (2013.01); *G05D 2201/0213* (2013.01)

(58) Field of Classification Search

CPC .............. G05D 1/0088; G05D 1/0212; G05D 2201/0213; B60W 50/00; G01C 21/3667

See application file for complete search history.

(56) References Cited

U.S. PATENT DOCUMENTS

| | | | | |
|---|---|---|---|---|
| 9,373,149 | B2 * | 6/2016 | Abhyanker | G06Q 50/28 |
| 10,042,359 | B1 * | 8/2018 | Konrardy | B60W 30/12 |
| 10,395,332 | B1 * | 8/2019 | Konrardy | G06Q 50/265 |
| 2003/0060937 | A1 * | 3/2003 | Shinada | G01C 21/3641 701/1 |
| 2014/0222277 | A1 * | 8/2014 | Tsimhoni | B60W 30/00 701/23 |
| 2017/0291615 | A1 * | 10/2017 | Kusano | B60W 50/14 |
| 2019/0196503 | A1 * | 6/2019 | Abari | G06Q 10/00 |

* cited by examiner

*Primary Examiner* — Russell Frejd
(74) *Attorney, Agent, or Firm* — Perspectives Law Group, Corp.

(57) ABSTRACT

A navigation system includes: a control unit configured to: determine an autonomous operation capability of an autonomous vehicle operation system to operate in an autonomous operation state; generate a planned travel route including an autonomous state prediction of the autonomous operation state for portions of the planned travel route; and a communication unit, coupled to the control unit, configured to provide operation instructions to the autonomous vehicle operation system for autonomous operation of a user vehicle along the planned travel route.

20 Claims, 5 Drawing Sheets

100 "CONSTRUCTION AHEAD!" 270 210 212 102 204 206 240 242 248 250 260 SUPERVISED COMBO 244 ROUTE 220 AUTONOMOUS STATE 230 FULLY AUTO 228 SUPERVISED 226 COMBO 224 FUNCTION 222 NO AUTO CRUISE CTRL OFF BLIND SPOT DETECT ON 214 246 208

NAVIGATION SYSTEM WITH ROUTE PREDICTION MECHANISM AND METHOD OF OPERATION THEREOF

TECHNICAL FIELD

An embodiment of the present invention relates generally to a navigation system, and more particularly to a system for route prediction.

BACKGROUND

Modern consumer and industrial electronics, especially devices such as graphical navigation systems, cellular phones, vehicle integrated navigation and computing systems, guided navigation system, and autonomous functions for vehicles, and self-driving cars, are providing increasing levels of functionality to support modern life including navigation and route guidance services. Research and development in the existing technologies can take a myriad of different directions.

As users become more empowered with the growth of navigation devices, vehicle based navigation services, and vehicle automation, new and old paradigms begin to take advantage of this new device space. There are many technological solutions to take advantage of this new device capability to enhance or augment navigation and route guidance. However, users are often not provided with significant information regarding their surroundings while using the devices.

Thus, a need still remains for a navigation system with a route prediction mechanism for operator awareness while using a navigation system. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a control unit configured to: determine an autonomous operation capability of an autonomous vehicle operation system to operate in an autonomous operation state; generate a planned travel route including an autonomous state prediction of the autonomous operation state for portions of the planned travel route; and a communication unit, coupled to the control unit, configured to provide operation instructions to the autonomous operation system for autonomous operation of a user vehicle along the planned travel route.

An embodiment of the present invention provides a method of operation of a navigation system including: determining an autonomous operation capability of an autonomous vehicle operation system to operate in an autonomous operation state; generate a planned travel route including an autonomous state prediction of the autonomous operation state for portions of the planned travel route; and providing operation instructions to the autonomous operation system for autonomous operation of a user vehicle along the planned travel route.

An embodiment of the present invention provides a non-transitory computer readable medium including instructions executable by a control circuit for a navigation system, the instructions including: determining an autonomous operation capability of an autonomous vehicle operation system to operate in an autonomous operation state; generate a planned travel route including an autonomous state prediction of the autonomous operation state for portions of the planned travel route; and providing operation instructions to the autonomous operation system for autonomous operation of a user vehicle along the planned travel route.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
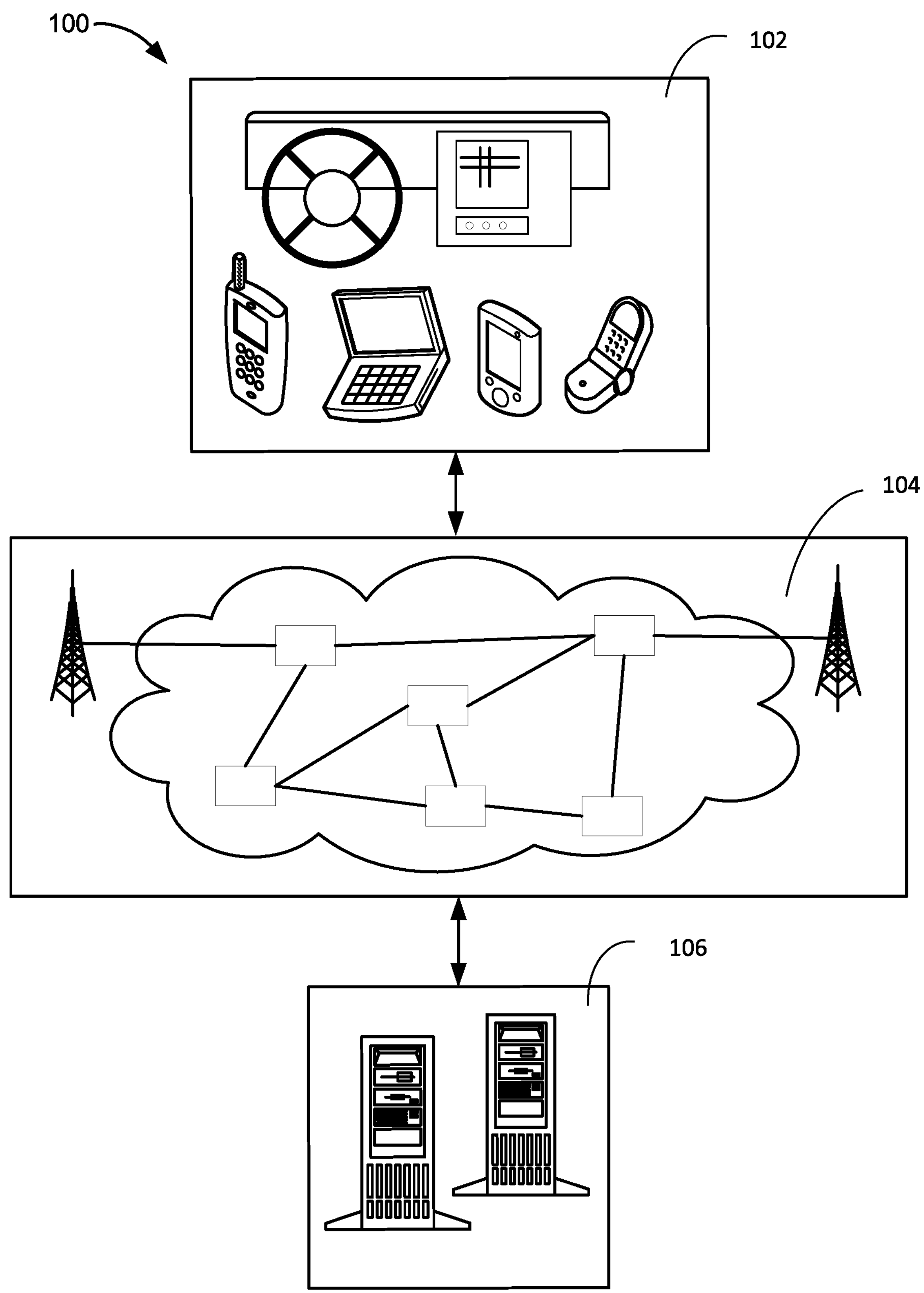
FIG. 1 is a navigation system with route prediction mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with route prediction mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system or computing device. The first device 102 can couple, either directly or indirectly, to the communication path 104 to communicate with the second device 106 or can be a stand-alone device.

The second device 106 can be any of a variety of centralized or decentralized computing devices, or sensor instrument or devices to take measurements or record environmental information. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
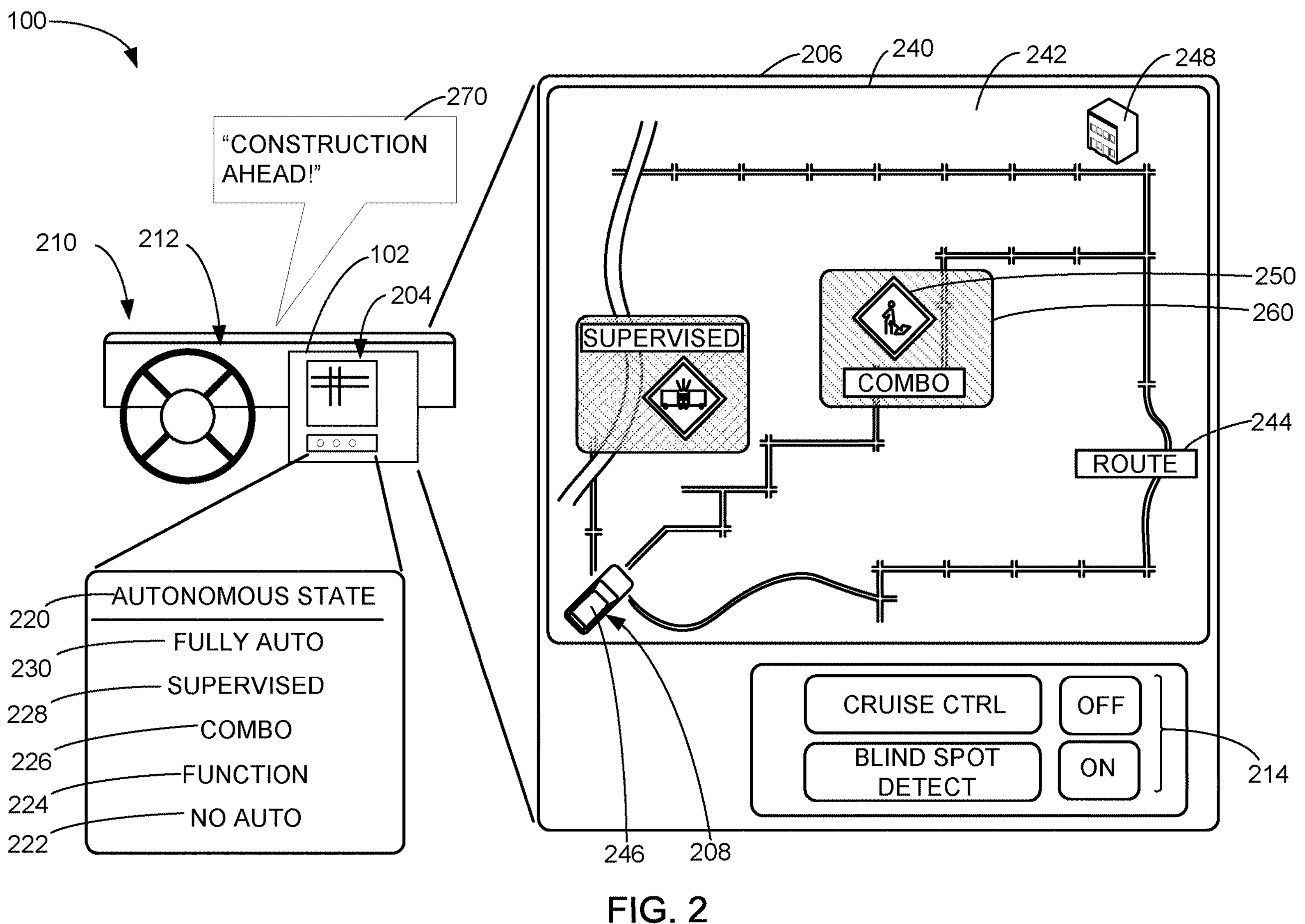
FIG. 2 is an example of a display interface of the first device of FIG. 1.

Referring now to FIG. 2, therein is shown an example of a system interface 210 of the first device 102 of FIG. 1. The system interface 210 can be a physical system as part of an attached or embedded vehicle interface of a user vehicle 208, such as a dashboard or center console interface, or a separate standalone device, such as a mobile device, a navigation device, mobile phone, or mobile computing device.

In an implementation of the first device 102 that is integrated with the user vehicle 208, the system interface 204 can include a display interface 206, instrument panel with a touch screen, keypad, other interface components, or a combination thereof. For illustrative purposes, the user vehicle 208 is depicted by a graphical representation on the display interface 206.

The system interface 210 can provide an interface for a system user (not shown) to interact with an autonomous vehicle operation system 210 of the user vehicle 208. The autonomous vehicle operation system 210 is a system that performs various functions and operations for autonomous control and operation of the user vehicle 208. For example, the autonomous vehicle operation system 210 can perform functions for autonomous driving of the user vehicle 208 and other related operations. As a specific example, the autonomous vehicle operation system 210 can operate the user vehicle 208 through control and operation of essential vehicle control functions 212, non-essential vehicle functions 214, or a combination thereof.

The essential vehicle control functions 212 are functions for driving the user vehicle 208. For example, the essential vehicle control functions 212 can include braking control functions, steering control functions, throttling control functions, or a combination thereof.

The non-essential vehicle functions 214 are functions related to or ancillary to driving of the user vehicle 208. More specifically, the non-essential vehicle functions 214 can be functions or systems that do not control the essential vehicle control functions of user vehicle 208. For example, the non-essential vehicle functions 214 can be supplemental safety systems or convenience systems. Examples supplemental safety systems can include collision warning, lane departure warning, blind spot monitoring. Examples of convenience systems can include automated controls for wipers, headlights, turn signals, or hazard lights.

The autonomous vehicle operation system 210 can control or operate the essential vehicle control functions 212, the non-essential vehicle functions 214, or a combination thereof to engage in various autonomous operation states 220.

The autonomous operation states 220 are a categorization of autonomous vehicle operation. For example, the autonomous operation states 220 can be categorized based on the classifications of the National Highway Traffic Safety Administration (NHTSA). As a specific example, the autonomous operation states 220 can correspond to the NHTSA automation level 0 to automation level 4 as a non-autonomous state 222, a function-specific autonomous state 224, a combined function autonomous state 226, a supervised autonomous state 228, a fully autonomous state 230, or a combination thereof.

The autonomous operation states 220 of the non-autonomous state 222 can correspond to the NHTSA "Automation Level 0." In the non-autonomous state 222, the autonomous vehicle operation system 210 can provide no automation for controlling, operating, or driving the user vehicle 208. More specifically, the occupant of the user vehicle 208 is in sole control of essential vehicle control functions 212 and is responsible for monitoring the roadway and for safe operation of the user vehicle 208. Performing the non-essential vehicle functions 214 by autonomous vehicle operation system 210 can be include in the non-autonomous state 222.

The autonomous operation states 220 of the function-specific autonomous state 224 can correspond to the NHTSA "Automation Level 1." In the function-specific autonomous state 224, the autonomous vehicle operation system 210 can provide "function-specific automation." More specifically, the function-specific autonomous state 224 can involve one or more of the essential vehicle control functions 212 of the user vehicle 208 that, when performed by the autonomous vehicle operation system 210, can operate independently from one another. In general, under the function-specific autonomous state 224, the occupant of the user vehicle 208 maintains overall control of the user vehicle 208, and is solely responsible for safe operation, but can choose to cede limited authority over specific or individual instances of the essential vehicle control functions 212, such as adaptive cruise control.

In the function-specific autonomous state 224, the autonomous vehicle operation system 210 can assist or augment the occupant of the user vehicle 208, such as providing added control in certain normal driving or crash-imminent situations with dynamic brake support in emergencies. However, there is no combination of the essential vehicle control functions 212 that operate in unison by the autonomous vehicle operation system 210 to enable the occupant of the user vehicle 208 to disengage from physically operating the user vehicle 208, such as removing hands from the steering wheel and feet off the pedals at the same time. Examples of function-specific autonomous state 224 can include cruise control, automatic braking, and lane keeping.

The autonomous operation states 220 of the combined function autonomous state 226 can correspond to the NHTSA "Automation Level 2." In the combined function autonomous state 226, the autonomous vehicle operation system 210 can provide "Combined Function Automation." More specifically, the combined function autonomous state 226 can provide automation of at least two of the essential vehicle control functions 212 working in unison to relieve the occupant of the user vehicle 208 of control of those functions. In general, under the combined function autonomous state 226, the occupant of the user vehicle 208 is responsible for monitoring the roadway for safe operation and is expected to be available for control at all times and on short notice. Further, the autonomous vehicle operation system 210 can utilize shared authority when the occupant of the user vehicle 208 cedes active control of the essential vehicle control functions 212 in certain limited driving situations.

In the combined function autonomous state 226, under the specific operating conditions for which the system is designed, the occupant of the user vehicle 208 can disengaged from physically operation of the essential vehicle control functions 212, such as hands off the steering wheel and feet off the pedals at the same time. However, the autonomous vehicle operation system 210 can relinquish control of the essential vehicle control functions 212 with no advance warning and the occupant of the user vehicle 208 should be prepared to control the vehicle safely at any time. Examples of the combined function autonomous state 226 include adaptive cruise control in combination with lane centering.

The autonomous operation states 220 of the supervised autonomous state 228, can correspond to the NHTSA "Automation Level 3." In the supervised autonomous state 228, the autonomous vehicle operation system 210 can provide "Limited Self-Driving Automation." In general, in the supervised autonomous state 228, the occupant of the user vehicle 208 is not expected to constantly monitor the roadway. More specifically, the supervised autonomous state 228 can enable the occupant of the user vehicle 208 to cede full control of all safety-critical functions under certain traffic or environmental conditions and, in those conditions, to rely heavily on the autonomous vehicle operation system 210 to monitor for changes in those conditions that would require transition back to manual control.

In the supervised autonomous state 228, the autonomous vehicle operation system 210 is designed to ensure safe operation of the user vehicle 208 during the automated driving and the occupant of the user vehicle 208 is expected to be available for occasional control. An example of the supervised autonomous state 228 can include determining when the autonomous vehicle operation system 210 is no longer able to support automation, such as from an oncoming construction area, and then signal to the occupant of the user vehicle 208 to reengage in manual control of the essential vehicle control functions 212.

The autonomous operation states 220 of the fully autonomous state 230 can correspond to the NHTSA "Full Self-Driving Automation." In the fully autonomous state 230, the autonomous vehicle operation system 210 performs all safety-critical driving functions and monitors roadway conditions for an entire trip. The fully autonomous state 230 can permit occupied and unoccupied vehicles since safe operation of the user vehicle 208 rests solely on the autonomous vehicle operation system 210. For example, under the fully autonomous state 230 the occupant of the user vehicle 208 can provide destination or navigation input, but is not expected to be available for control of the essential vehicle control functions 212 at any time during the trip.

For illustrative purposes, the autonomous operation states 220 are based on the automation levels under NHTSA, however, it is understood that other types of the autonomous operation states 220 can be used to determine differently, which could include fewer or greater number of the autonomous operation states 220. For example, the autonomous operation states 220 can be based on the Society of Automotive Engineers (SAE) standard, which includes six levels of automation. The first four levels of the SAE standard can be similar to those of the NHTSA, while fifth and sixth level of the SAE standard can include differ from those of the NHTSA. For example, under the SAE standard, the fifth level of the autonomous operation states 220 can allow the autonomous vehicle operation system 210 to fully control the user vehicle 208 through operation and monitoring of the essential vehicle control functions 212, the non-essential vehicle functions 214, or a combination thereof under limited or specific circumstances. As another example, under the SAE standard, a sixth level of the autonomous operations states 220 can allow the autonomous vehicle system operation 210 to fully control the user vehicle 207 under all conditions that the system user could also be able to operate the user vehicle 208.

The system interface 204 can present a navigation map 240. The navigation map 240 is a graphical representation of a geographical area. For example, the navigation map 240 can depict the geographic area of a travel region 242. The travel region 242 is a geographic region spanning an area for travel between two locations. For example, the travel region 242 including a graphical representation of an origin location 246, a graphical representation of a destination location 248, or a combination thereof.

The origin location 246 is a geographic location set as the beginning of travel along a route. For example, the origin location 246 can be the geographic position of the system user (not shown) prior to travel to the destination location 248. For illustrative purposes, the origin location 246 is depicted by a graphical representation of the user vehicle 208, although it is understood that the origin location 246 can be depicted differently. For example, the can be represented as a graphical representation of the system user.

The destination location 248 is a geographic location set as the end of travel along a route. For example, the destination location 248 can be a location that the system user has input into the navigation system 100 for travel to using the user vehicle 208.

The navigation map 240 can include a depiction of a planned travel route 244. The planned travel route 244 is a path or route that can be followed from a start point to a destination. For example, the planned travel route 244 can be a route between the origin location 246 and the destination location 248.

The navigation map 240 can depict the planned travel route 244 including autonomous state predictions 260. The autonomous state predictions 260 are predictions of the autonomous operation states 220 along the planned travel route 244. The autonomous state predictions 260 can correspond to the capability of the autonomous vehicle operation system 210 to operate in a particular one of the autonomous operation states 220 for expected route conditions 250 along the planned travel route 244.

The expected route conditions 250 are conditions or situations that are expected to occur along the planned travel route 244. For example, the expected route conditions 250 can be conditions or situations that can affect or determine the autonomous operation states 220 of the autonomous vehicle operation system 210. As specific examples, the expected route conditions 250 can include situations that can change or limit the autonomous operation states 220 that the autonomous vehicle operation system 200 is capable of operating, such as construction zones, events, such as children arriving or leaving school, people arriving or leaving a sporting or entertainment event, weather patterns, such as rain or fog. The expected route conditions 250 can be determined at or correspond with the conditions at the time the user vehicle 208 is expected to travel along the planned travel route 244.

The autonomous state predictions 260 can be different based the ability of the autonomous vehicle operation system 210 to operate the essential vehicle control functions 212 in the different types of the expected route conditions 250. For example, the expected route conditions 250 for a straight road with high visibility and low traffic can have the autonomous state predictions 260 of the fully autonomous state 230. In another example, the expected route conditions 250 for travel near an elementary school when children are leaving the school can have the autonomous state predictions 260 of the non-autonomous state 222 or the function-specific autonomous state 224. The autonomous state predictions 260 can be determined based on the capabilities of the autonomous vehicle operation system 210, which will be discussed in greater detail below. Further, the functions described above will be discussed in greater detail below.

Optionally, the navigation system 100 can provide operation alerts 270 to the system user regarding details or changes to the autonomous operation states 220. For example, the navigation system 100 can provide the operation alerts 270 to alert the system user about upcoming changes in the autonomous operation states 220 while traveling along the planned travel route 244. For instance, the navigation system 100 can provide the operation alerts 270 as a notification that the system user my need to assume control of some or all of the essential vehicle control functions 224, such as when going from the supervised autonomous state 228 to the combined function autonomous state 226 or the non-autonomous state 222. In another instance, the navigation system 100 can provide the operation alerts 270 to notify the system user that a higher level of the autonomous operation states 222 can be engaged by the autonomous vehicle operation system 210, such as going from the supervised autonomous state 228 to the fully autonomous state 230.

The navigation system 100, for example, can provide the operation alerts 270 to the system user by audio cues or messages, visual cues or messages, haptic cues, or a combination thereof. For example, the navigation system 100 can provide the operation alerts 270 as an audio message stating the upcoming change in the autonomous operation states 220 and additional information, such why the change in the autonomous operation states 220 is occurring and what level of engagement may be required by the system user for operating the user vehicle 208. As a specific example, in the situation where the user vehicle 208 is approaching a construction zone, the navigation system 100 can provide the operation alerts 270 as a visual message, an audio message, or a combination thereof, which can state "Attention, construction zone ahead. Please be alert for possible change to manual operation of the vehicle."

Figure 3:
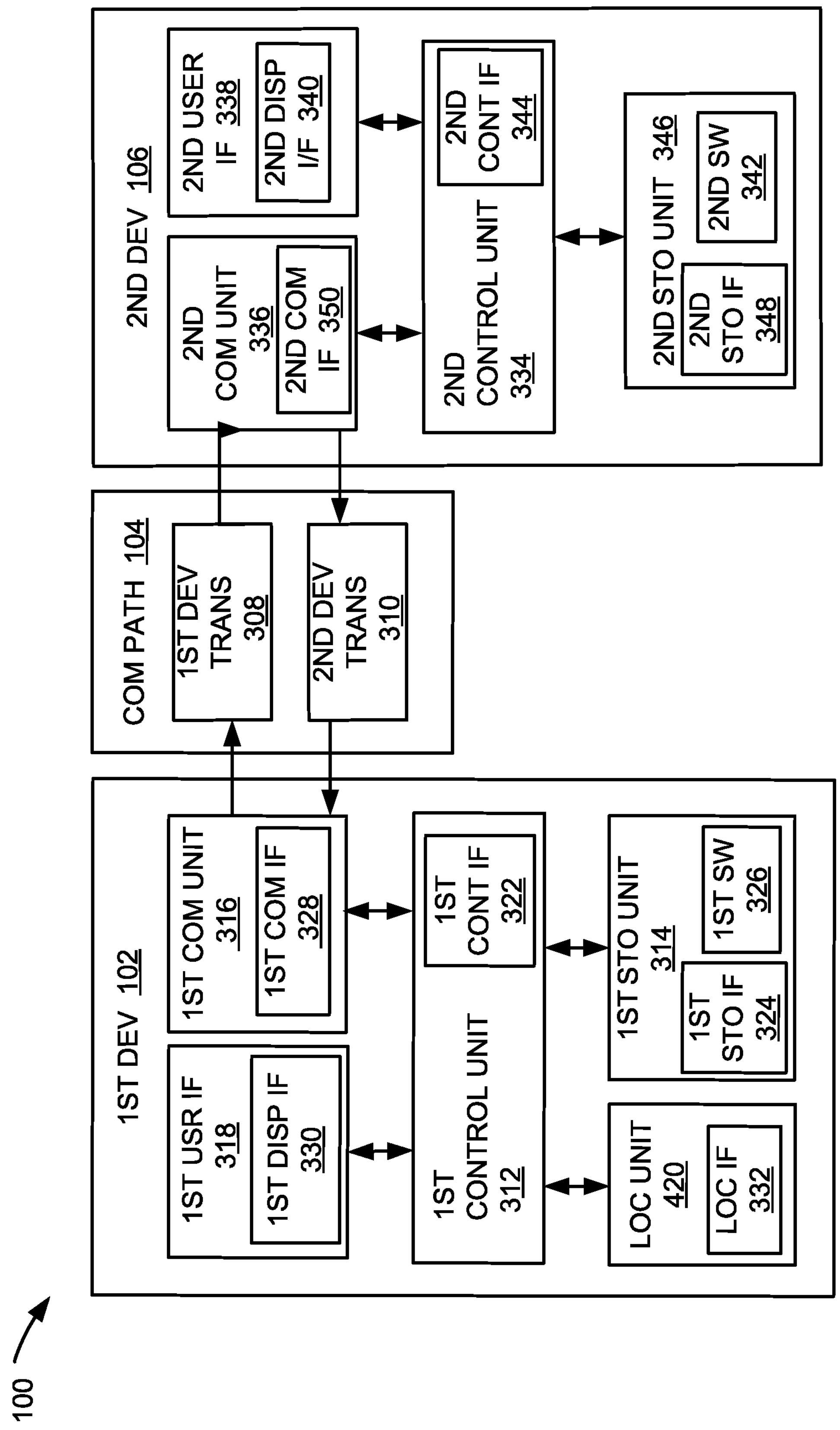
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information. For example, first storage unit 314 information for generating the navigation map 240 of FIG. 2

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, a camera for capturing motion or gesture inputs, or any combination thereof to provide data and communication inputs. Examples of the output device display components, haptic feedback components, audio components such as a speaker, or a combination thereof.

The first user interface 318 can include a first display interface 330. The first display interface 330 can include a display, a projector, a video screen, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera for capturing motion or gesture inputs, or any combination thereof to provide data and communication inputs. Examples of the output device of the second user interface 338 can include a second display interface 340, haptic feedback components, audio components such as a speaker, or a combination thereof. The second display interface 340 can include a display, a projector, a video screen, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information for generating the navigation map 240 of FIG. 2. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
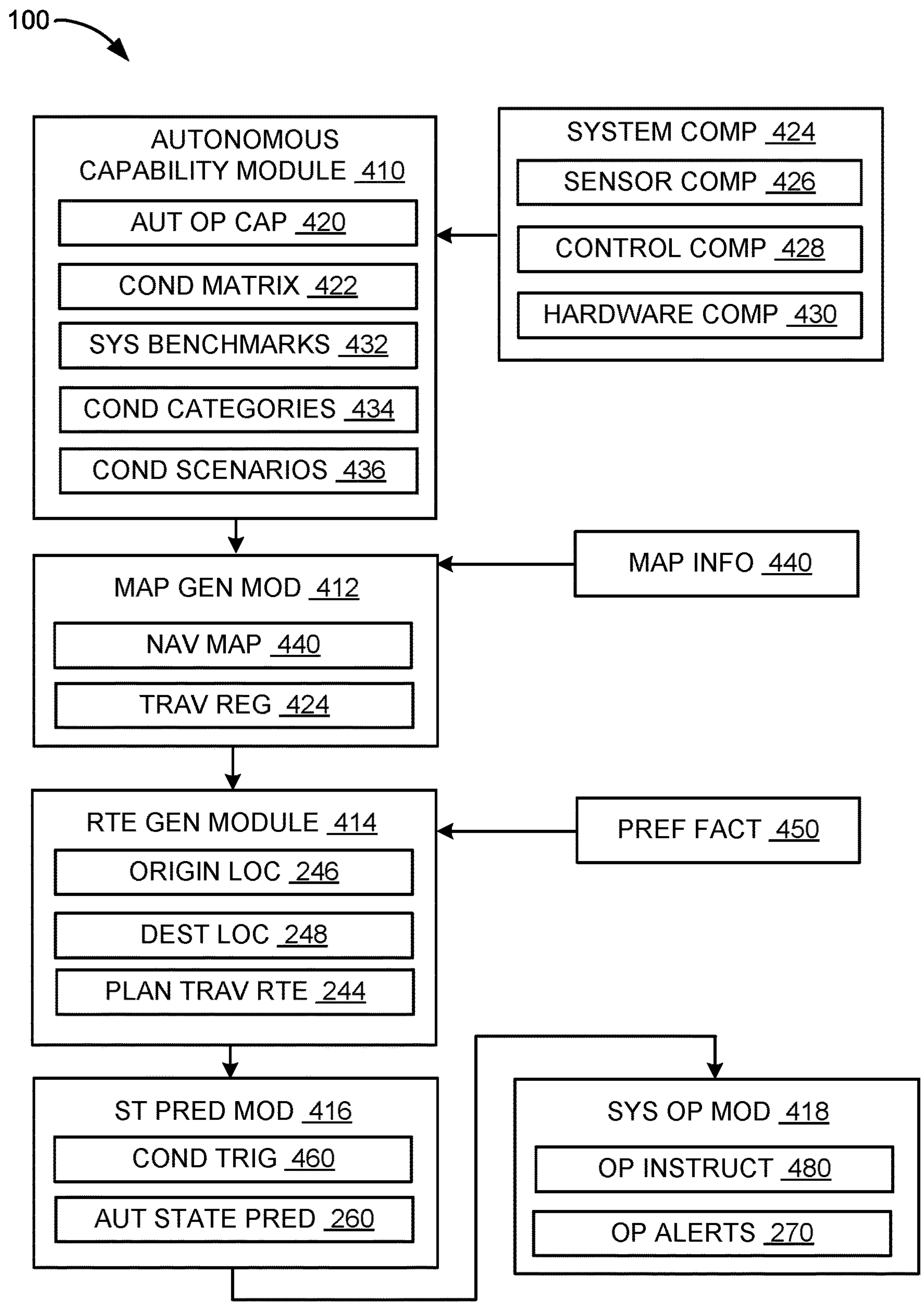
FIG. 4 is a control flow of the navigation system.

Referring now to FIG. 4, therein is shown a control flow of the navigation system 100. The navigation system 100 can include an autonomous capability module 410, a map generation module 412, a route generation module 414, a state prediction module 416, and a system operation module 418. The map generation module 412 can be coupled to the autonomous capability module 410. The route generation module 414 can be coupled to the map generation module 412. The state prediction module 416 can be coupled to the route generation module 414. The system operation module 418 can be coupled to the route generation module 414.

The autonomous capability module 410 is for determining an autonomous operation capability 420 of the autonomous vehicle operation system 210 for the user vehicle 208 of FIG. 2. The autonomous operation capability 420 is the capability of the autonomous vehicle operation system 210 to operate at a particular state of the autonomous operation states 220 in various conditions. For example, the autonomous operation capability 420 can be based on the limitations of the sensors, hardware, and software of the autonomous vehicle operation system 210 to control the functions of the user vehicle 208 in different types of the expected route conditions 250. More specifically, the autonomous operation capability 420 can be the capability of the autonomous vehicle operation system 210 to perform the essential vehicle control functions 212 of FIG. 2, the non-essential vehicle functions 214 of FIG. 2, or a combination thereof.

The autonomous operation capability 420 can be limitations or the capability of system components 424. The system components 424 are components used for autonomous operation of the user vehicle 208. For example, the system components 424 can be components for controlling and performing the essential vehicle control functions 212, the non-essential vehicle functions 214 of, or a combination thereof. The system components 424 can include sensor components 426, control components 428, hardware components 430, or a combination thereof.

The sensor components 426 are sensors or instruments to detect, record, observe, or a combination thereof environmental conditions surrounding the user vehicle 208. For example, the sensor components 426 can include various sensors operable to identify a condition associated with and around the user vehicle 208. The sensor components 426 can include sensors such as imagery sensors, RADAR, SONAR, LIDAR, sound capture devices, microphones, or a combination thereof.

The control components 428 are components for processing input and generating output for operating the autonomous functions of the user vehicle 208. For example, the control components 428 can process information from the sensor components 426 and provide instructions to the hardware components 430 to perform the essential vehicle control functions 212, the non-essential vehicle functions 214, or a combination thereof. The control components 428 can include a combination of hardware, such as the first control unit 316 of FIG. 3, the first storage unit 314 of FIG. 3, the first communication unit 316 of FIG. 3, and software, such as the first software of FIG. 3, which can include control algorithms for processing information from the sensor components 426 and generating the instructions.

The hardware components 430 are the physical devices or components for controlling the mechanisms in the user vehicle 208. For example, the hardware components 430 can include wiring, circuitry or other connections, actuators, or a combination thereof for controlling steering, braking, throttling, or a combination thereof for the user vehicle 208.

The autonomous capability module 410 can determine the autonomous operation capability 420 in a number of ways. For example, the autonomous capability module 410 can determine the autonomous operation capability 420 by evaluating the system components 424 of the autonomous vehicle operation system 210, evaluating the ability of the autonomous vehicle operation system 210 to operate the user vehicle 208 under various types of the expected route conditions 250 of FIG. 2, or a combination thereof.

In the example of determining the autonomous operation capability 420 based on evaluation of the system components 424, the autonomous capability module 410 can check the specifications of the sensor components 426, such as sensitivity, resolution, and granularity of sensor readings, types of instruments, range of detection, or whether the sensor components 426 are functioning properly. As another example, the autonomous capability module 410 can determine the autonomous operation capability 420 by testing the limits, speed, and abilities of the control components 428 to accurately process and interpret information from the sensor components 426 and generate instructions and commands based on the information to operate and control the user vehicle 208 using the hardware components 430. As a specific example, control components 428 can be evaluated by testing processing speed and power of the control components 428 or by checking the versions of the control algorithms. In a further example, the autonomous capability module 410 can evaluate the hardware components 430 by evaluating the functionality or determining the existence of circuitry, actuators, wiring or connections between the control components 428 and the steering, braking, and throttling systems of the user vehicle.

In one implementation, the autonomous capability module 410 can determine the autonomous operation capability 420 based on autonomous system benchmarks 432. The autonomous system benchmarks 432 can be minimum requirements of the system components 424 for operating at a particular instance of the autonomous operation states 220. For example, each of the autonomous operation states 220 can have a corresponding instance of the autonomous system benchmarks 432, which for example can be determined by government or manufacture safety standards or guidelines. The autonomous capability module 410 can determine the autonomous operation capability 420 by comparing the system components 424 to the autonomous system benchmarks 432 of the autonomous operation states 220. For example, if the autonomous capability module 410 determines that the system components 424 of the only have the capability to operate in the supervised autonomous state 228, then the autonomous operation capability 420 can have a maximum capability of autonomous operation in the supervised autonomous state 228.

In the example of determining the autonomous operation capability 420 based the expected route conditions 250, the autonomous capability module 410 can evaluate the autonomous vehicle operation system 210 based on condition scenarios 434. The condition scenarios 434 are possible situations that the autonomous operation system 210 can encounter while operating the user vehicle 208. For example, the condition scenarios 434 can be one or a combination of condition categories 436.

The condition categories 436 are the classifications of the various conditions the user vehicle 208 can encounter along the planned travel route 224. For example, the condition categories 436 can include traffic, weather, road conditions, events, and construction. Each of the condition categories 436 can include a variety of conditions. For example, the specific instance of the condition categories 436 for weather can include rainy weather, the degree or severity of the rain, snowy weather, or clear weather. As another example, the specific instance of the condition categories 436 for road conditions can include the number of lanes, the width of the lanes, the road surface, such as paved or unpaved, or the curvature of the road.

The autonomous capability module 410 can determine the autonomous operation capability 420 by comparing the system components 424 with the condition scenarios 434. For example, the autonomous capability module 410 can determine the maximum level of the autonomous operation states 220 the autonomous vehicle operation system 210 can operate at with the system components 424 under a given instance of the condition scenarios 434. As a specific example, for the instance of the condition scenarios 434 that includes the condition categories 436 of a straight paved road with high surrounding visibility under clear weather conditions and no vehicle or pedestrian traffic, the autonomous capability module 410 can determine that the autonomous operation capability 420 as the fully autonomous state 230 for a given set of the system components 426. As another specific example, for the instance of the condition scenarios 434 that includes the condition categories 436 of windy unpaved roads in mountainous terrain under rainy weather, the autonomous capability module 410 can determine that the autonomous operation capability 420 as the non-autonomous state for a given set of the system components 426. In general, as the system components 424 of the autonomous vehicle operation system 210 improve, the autonomous operation capability 420 to operate at higher levels of the autonomous operation states 220 under a greater number of the condition scenarios 434 will increase as well.

The autonomous capability module 410 can compile and store the autonomous operation capability 420, including the system benchmarks 432, the autonomous operation states 220 corresponding to the condition scenarios 436, or a combination thereof in a condition matrix 422. The condition matrix 422 is a reference to determine which of the autonomous operation states 220 the autonomous vehicle operation system 210 can operate in for a given instance of the condition scenarios 436. The condition matrix 422 can be used to determine the autonomous state predictions 260, which will be discussed in detail below.

The control flow can pass form the autonomous capability module 410 to the map generation module 412. The map generation module 412 is for generating the navigation map 240 of FIG. 2. The map generation module 412 can generate the navigation map 240 based on map information 440.

The map information 440 is information representing a geographic area. For example, the map information 440 can include, but is not limited to, information about travel infrastructure, such as roads, highways, overpasses, railroad tracks and crossings, tunnels, and bridges. The map information 440 can further include details about the road ways, including the number of lanes on the highway, one way streets, divided highways, lane mere sections, lane restrictions such as high occupancy or toll lanes, bicycle lanes, road conditions such as paved or unpaved roads. In another example, the map information 440 can include locations and types of manmade structures, such as hospitals, homes, business parks, shopping malls, gas stations and other types of buildings. In a further example, the map information 440 can include information about geographic features, such as terrain, bodies of water, and topography; or a combination thereof.

The map generation module 412 can receive the map information 440 from various sources. For example, the map generation module 412 can receive the map information 440 stored in the first control unit 312 of FIG. 3 of the first device 102. In another example, the map generation module 412 can receive the map information 440 from a device other than the first device 102, such as an external storage unit or server, the second storage unit 314 of FIG. 3, or a combination thereof.

The map generation module 412 can process the map information 440 to generate the navigation map 240. For example, the map information 440 can be raw or unprocessed geographic data or information, or processed geographic data or information, such as pre-generated or pre-rendered maps or images representing the geographic data or information. In the case of raw or unprocessed information, the map generation module 412 can render the navigation map 240 from the map information 440. In the case of the processed information, the map generation module 412 can alter or modify the map information 440, such as resizing, cropping, adding or removing information, or a combination thereof to generate the navigation map 240 based on the travel region 242 of FIG. 2.

The control flow can pass form the map generation module 412 to the route generation module 414. The route generation module 414 is for generating possible travel routes between a starting location and a destination. The route generation module 414 can generate the planned travel route 244 of FIG. 2, between the origin location 246 and the destination location 248.

The route generation module 414 can determine the origin location 246 and the destination location 248. For example, route generation module 414 can interface with the location unit 320 of FIG. 3 of the first device 102 to determine the origin location 246, such as the GPS coordinates or the longitude and latitude of the user or the user vehicle 208. In another example, the route generation module 414 can identify the destination location 248 from the map information 440.

The route generation module 414 can generate the planned travel route 244 in a number of different ways. For example, the route generation module 414 can generate the planned travel route 244 based on preference factors 450. The route preference factors 450 are limits to the generation of the planned travel route 244. For example, the route preference factors 450 can include shortest or longest distance for autonomous operation user vehicle 208, shortest distance, fastest travel time, or least amount of traffic. As another example, the route preference factors 450 can include a scenic route option, which can include navigation through areas that have been designated, such as through user reviews or government agencies, as scenic areas. As a further example, the preference factors 450 can include an option for fuel efficiency, which can include route segments for minimizing fuel or energy consumption, direct the autonomous vehicle operation system 210 to operate the user vehicle to minimizing fuel or energy consumption, or a combination thereof. The route generation module 414 can utilize the map information 440 to identify roads or paths between the origin location 246 and the destination location 248 that conform to the route preference factors 450 to generate the planned travel route 244.

The control flow can pass from the route generation module 414 to the state prediction module 416. The state prediction module 416 is for calculating the autonomous state predictions 260 of FIG. 2. For example, the state prediction module 416 can search the planned travel route 244 to identify condition triggers 460 corresponding to the expected route conditions 250. The condition triggers 460 are information that indicates the existence of the expected route conditions 250. More specifically, the condition triggers 460 can be information about the expected route conditions 250 for locations or areas along the planned travel route 244 that can potentially cause changes to different levels of the autonomous operation states 220.

The condition triggers 460 can include real time data, such as traffic information including vehicle and pedestrian traffic level or type, construction information, location specific information, such as crime statistics and school schedules, weather information. The condition triggers 460 can also include statistical and historical information, such as traffic patterns, accident history. The condition triggers 460 can be determined at the time the user vehicle 208 is expected to traverse the planned travel route 244. More specifically, the condition triggers 460 can factor in time and date consideration including the time of day and the date, such as day of the week or public holidays, or seasons. For example, a primary school, middle school, or high school can have student associated traffic around specific hours during the week days, but little to no student associated traffic during the summer seasons, weekend days, or public holidays.

Further, the condition triggers 460 can be based on the condition types, such as location triggers, event triggers, or a combination thereof. The location triggers are particular locations or areas where the expected route conditions 250 can occur. For example, the location triggers can include schools zones, entertainment venues, tourist attractions, transportation hubs, intersections, highway interchanges, train crossings, toll plazas, or construction zone.

The event triggers are they types of events or situations that can indicate the existence of the expected route conditions 250. For example, the event triggers can be known or scheduled events or situations, including the beginning or ending of a school day or entertainment event; the scheduled arrival or departure of a mass passenger transportation vehicle, such as a bus, train, or cruise ship; or a traffic accident. Other examples of the event triggers can be transient obstructions, such as the crossing of trains at a rail crossing or ship at a draw bridge. As specific examples, the transient obstructions can be determined based on a schedule, such as a train or ship time table, or detected through the sensor components 426 or tracking units on the train or ship.

The state prediction module 416 can determine the autonomous state predictions 260 based on the condition matrix 422. For example, the state prediction module 416 can compare the expected route conditions 250 with the condition matrix 422 to identify a corresponding instance of the condition scenarios 434. To continue the example, the state prediction module 416 can determine the autonomous state predictions 260 as the instance of the autonomous operation states 220 corresponding to a specific instance of the condition scenarios 434 in the condition matrix 422 that matches the expected route conditions 250. As a specific example, for the expected route conditions 250 of a road during rainy weather conditions, the state prediction module 416 can search for the matching instance of the condition scenarios 436 in the condition matrix 422 and the corresponding instance of the autonomous operation capability 420, which can be set as the autonomous state predictions 260.

The control flow can pass from the state prediction module 416 to the system operation module 418. The system operation module 418 is for providing operation instructions 480 to the autonomous vehicle operation system 210 for operation of the user vehicle 208. The system operation module 418 can provide operation instructions 480 to include the planned travel route 244 to the autonomous vehicle operation system 210 for autonomous operation from the origin location 246 to the destination location 248. The operation instructions 480 can include instructions to the autonomous vehicle operation system 210 to operate the essential vehicle control functions 212, the non-essential vehicle functions 214, or a combination thereof. As an example, the system operation module 418 can provide the operation instructions 480 to the autonomous vehicle operation system 210 through the communication unit 316 of FIG. 3.

Optionally, the system operation module 418 can generate the operation alerts 270 of FIG. 2 regarding upcoming instances of the expected route conditions 250, upcoming changes to the autonomous operation states 220, or a combination thereof. For example, the system operation module 418 can implement the first user interface 318 of FIG. 3, the second user interface 338 of FIG. 3, or a combination thereof to provide the operation alerts. More specifically, the system operation module 418 can provide the operation alerts to the system user by audio cues or messages, visual cues or messages, haptic cues, or a combination thereof.

It has been discovered that the navigation system 100 provides improved operation safety of the user vehicle 208. Providing the autonomous state predictions 260 for the planned travel route 244 can improve awareness of the occupant of user vehicle 208 by informing the occupant of the autonomous operation states 220 well before the expected route conditions 250 are reached, which improves the safety and reliability in operating the user vehicle 208.

The navigation system 100 has been described with module functions or order as an example. The navigation system 100 can partition the modules differently or order the modules differently. For example, the map information module 410 can be coupled to the interface generation module 416.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from generating the autonomous state predictions 260 based on the expected route conditions 250 results in the movement in the physical world, such as autonomous operation of the user vehicle 212 along the planned travel route 244. Movement in the physical world, such as navigation into the expected route conditions 250, results in changes to the autonomous operation states 220 by the autonomous vehicle operation system 210.

Figure 5:
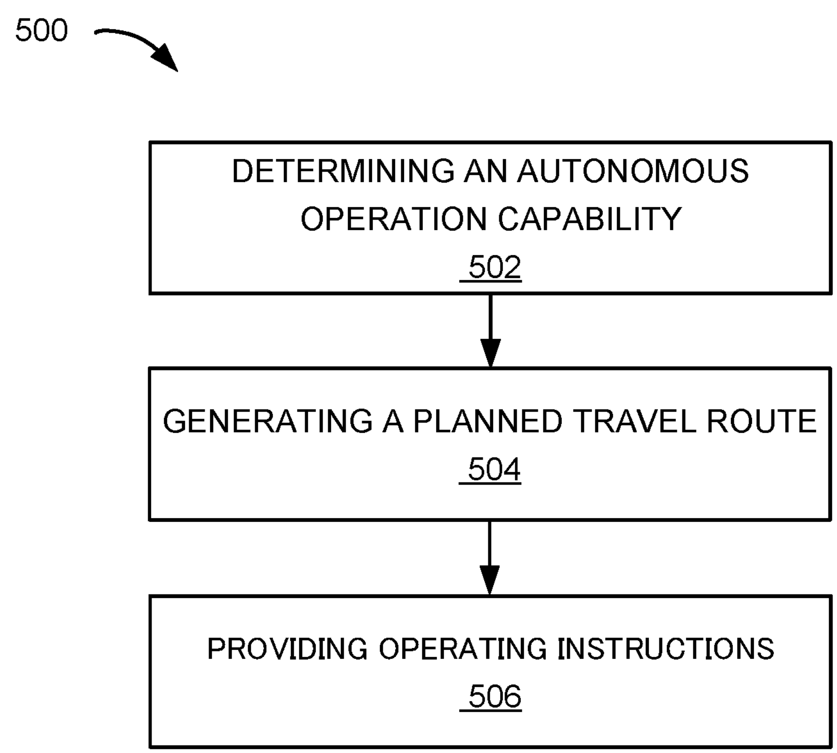
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: determining an autonomous operation capability of an autonomous vehicle operation system to operate in an autonomous operation state in a block 502; generate a planned travel route including an autonomous state prediction of the autonomous operation state for portions of the planned travel route in a block 504; and providing operation instructions to the autonomous operation system for autonomous operation of a user vehicle along the planned travel route in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:

a control unit configured to:

determine an autonomous operation capability of an autonomous vehicle operation system to operate in an autonomous operation state by evaluating sensor components including evaluating functionality between control components and a steering system;

generate a planned travel route including an autonomous state prediction of the autonomous operation state for portions of the planned travel route; and a communication unit, coupled to the control unit, configured to provide operation instructions to the autonomous vehicle operation system for autonomous operation of a user vehicle along the planned travel route.

2. The system as claimed in claim 1 wherein the control unit is configured to identify the expected route condition based on a condition trigger.

3. The system as claimed in claim 1 wherein the control unit is configured to determine the autonomous operation capability to operate in the autonomous operation state includes a fully autonomous state, a supervised autonomous state, a combined function autonomous state, a function-specific autonomous state, a non-autonomous state, or a combination thereof.

4. The system as claimed in claim 1 wherein the control unit is configured to wherein determine the autonomous operation capability includes determining the autonomous operation capability based on a condition scenario.

5. The system as claimed in claim 1 wherein the control unit is configured to provide the autonomous vehicle operation system includes controlling an essential vehicle operation function, non-essential vehicle function, or a combination thereof.

6. The system as claimed in claim 1 wherein the control unit is configured to determine the autonomous operation capability includes determining the autonomous operation capability based on evaluation of system components of the autonomous vehicle operation system.

7. The system as claimed in claim 1 wherein the control unit is configured to generate the planned travel route includes generating the planned travel route between an origin location and a destination location.

8. A method of operation of a navigation system comprising:

determining an autonomous operation capability of an autonomous vehicle operation system to operate in an autonomous operation state by evaluating sensor components including evaluating functionality between control components and a steering system;

generate a planned travel route including an autonomous state prediction of the autonomous operation state for portions of the planned travel route; and providing operation instructions to the autonomous vehicle operation system for autonomous operation of a user vehicle along the planned travel route.

9. The method as claimed in claim 8 further comprising identifying the expected route condition based on a condition trigger.

10. The method as claimed in claim 8 wherein determining the autonomous operation capability to operate in the autonomous operation state includes a fully autonomous state, a supervised autonomous state, a combined function autonomous state, a function-specific autonomous state, a non-autonomous state, or a combination thereof.

11. The method as claimed in claim 8 wherein determining the autonomous operation capability includes determining the autonomous operation capability based on a condition scenario.

12. The method as claimed in claim 8 further comprising providing the autonomous vehicle operation system includes control of an essential vehicle operation function, non-essential vehicle function, or a combination thereof.

13. The method as claimed in claim 8 wherein determining the autonomous operation capability includes determining the autonomous operation capability based on evaluation of system components of the autonomous vehicle operation system.

14. The method as claimed in claim 8 wherein generating the planned travel route includes generating the planned travel route between an origin location and a destination location.

15. A non-transitory computer readable medium including instructions executable by a control circuit for a navigation system, the instructions comprising:

determining an autonomous operation capability of an autonomous vehicle operation system to operate in an autonomous operation state by evaluating sensor components including evaluating functionality between control components and a steering system;

generate a planned travel route including an autonomous state prediction of the autonomous operation state for portions of the planned travel route; and providing operation instructions to the autonomous vehicle operation system for autonomous operation of a user vehicle along the planned travel route.

16. The non-transitory computer readable medium as claimed in claim 15, further comprising identifying the expected route condition based on a condition trigger.

17. The non-transitory computer readable medium as claimed in claim 15, wherein determining the autonomous operation capability to operate in the autonomous operation state includes a fully autonomous state, a supervised autonomous state, a combined function autonomous state, a function-specific autonomous state, a non-autonomous state, or a combination thereof.

18. The non-transitory computer readable medium as claimed in claim 15, wherein determining the autonomous operation capability includes determining the autonomous operation capability based on a condition scenario.

19. The non-transitory computer readable medium as claimed in claim 15, further comprising providing the autonomous vehicle operation system includes control of an essential vehicle operation function, non-essential vehicle function, or a combination thereof.

20. The non-transitory computer readable medium as claimed in claim 15, wherein determining the autonomous operation capability includes determining the autonomous operation capability based on evaluation of system components of the autonomous vehicle operation system.

* * * * *